United States Patent Office 3,177,362
Patented Apr. 6, 1965

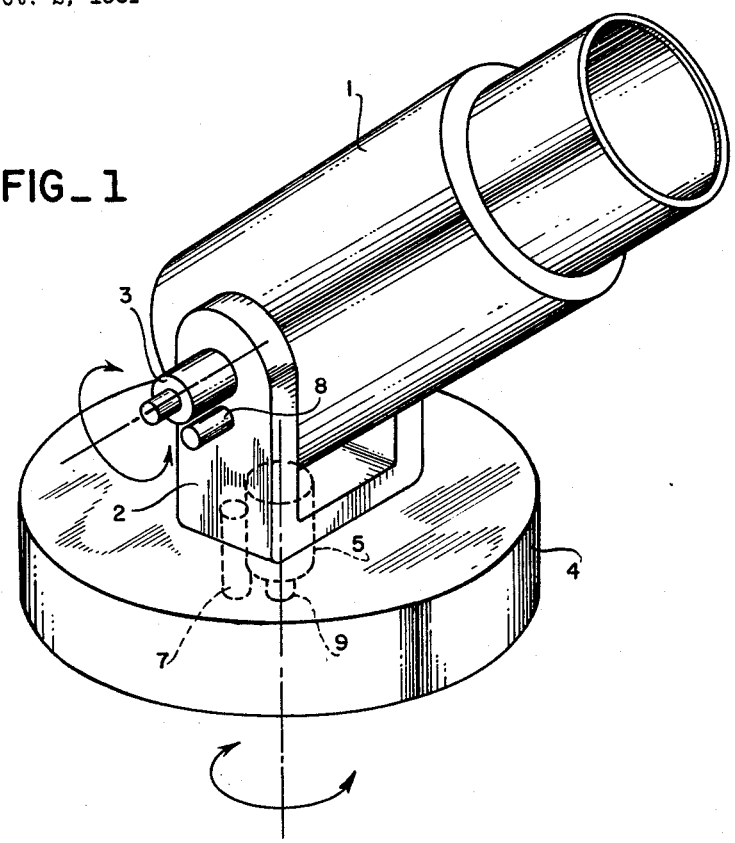
FIG_1
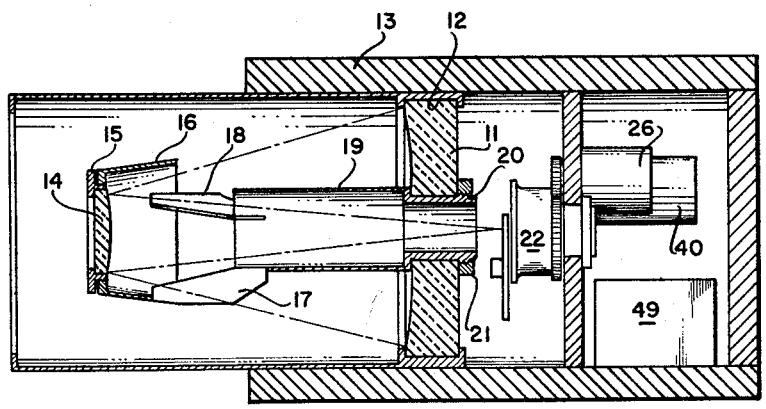
FIG_2

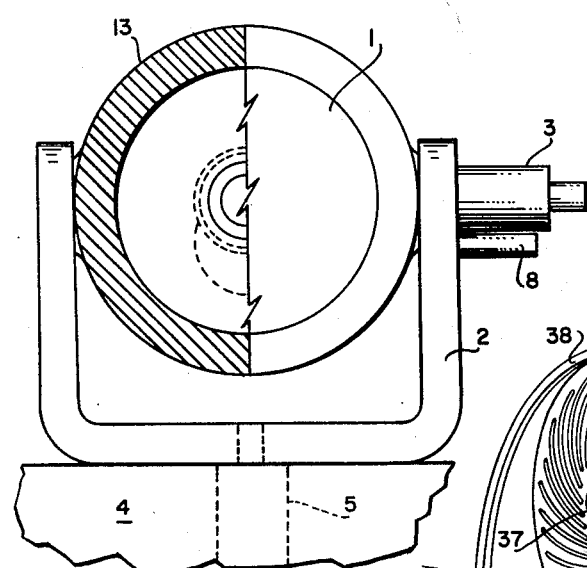
FIG. 3
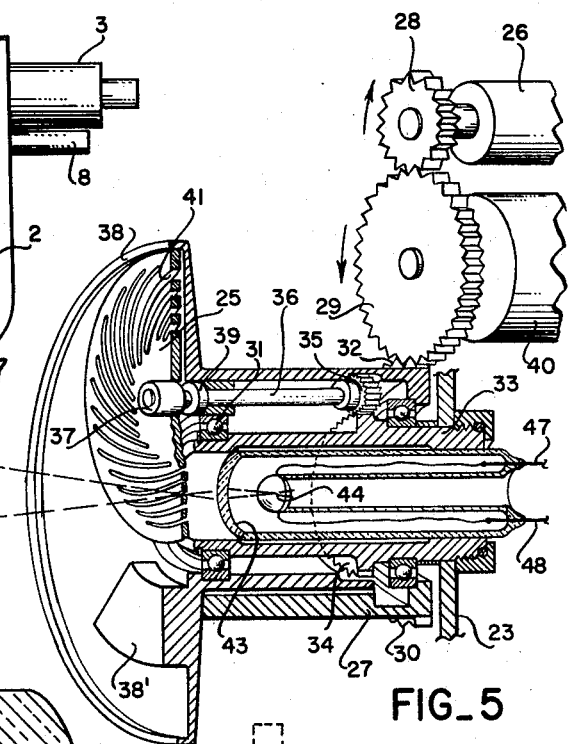
FIG. 5
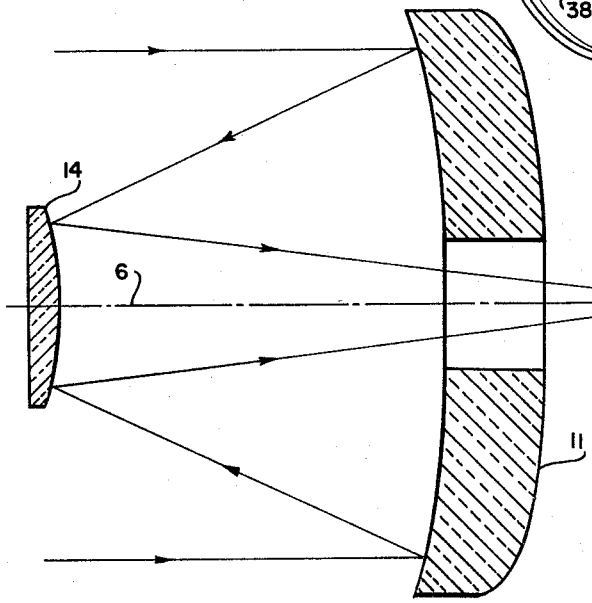
FIG. 4
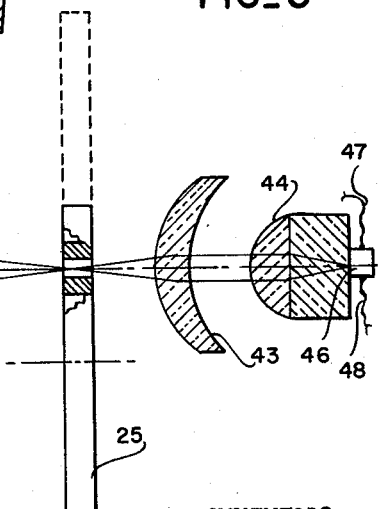
INVENTORS
EDGAR W. KUTZSCHER
DOMINIC AMARA
By George Sullivan
Agent

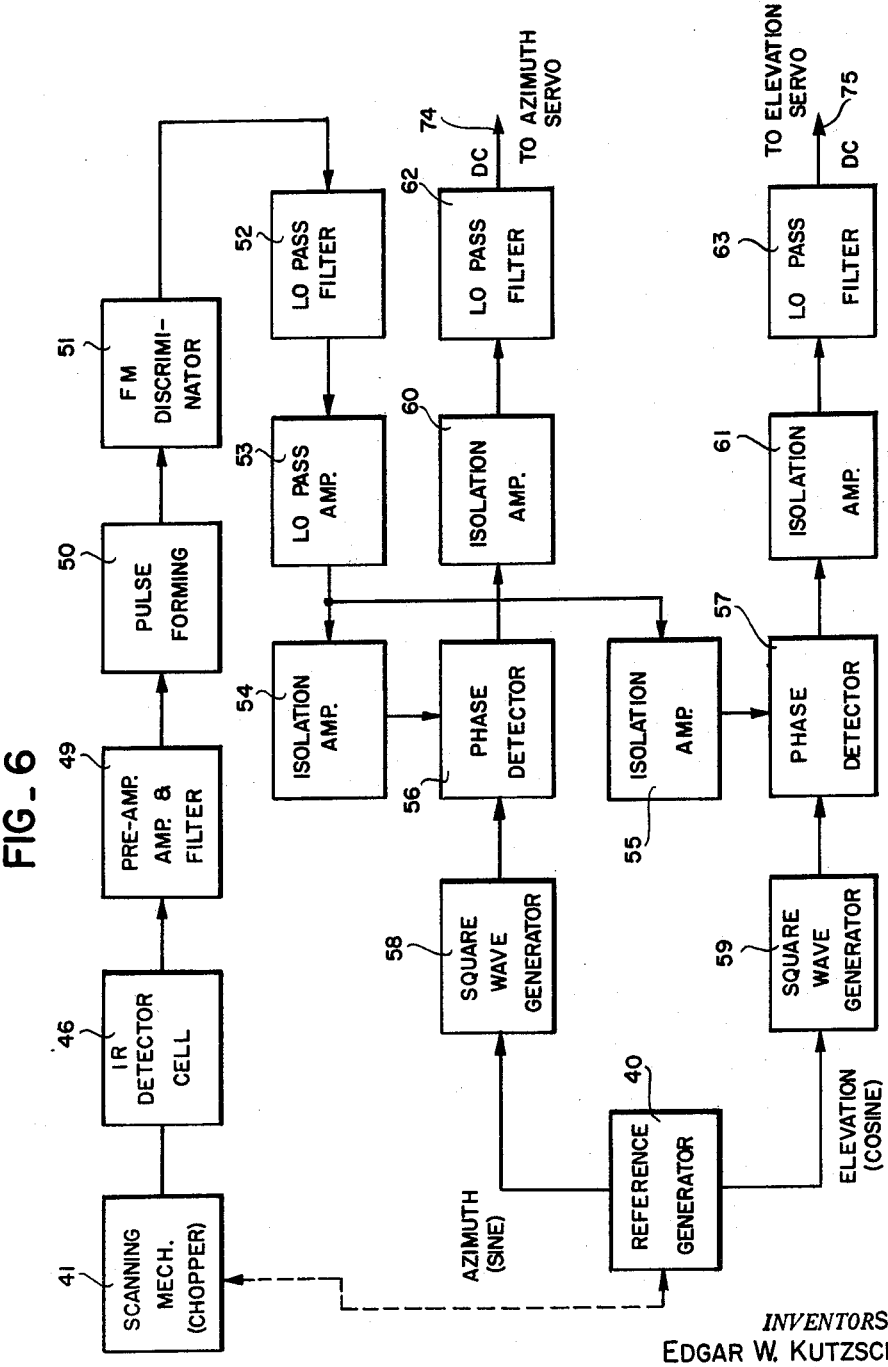

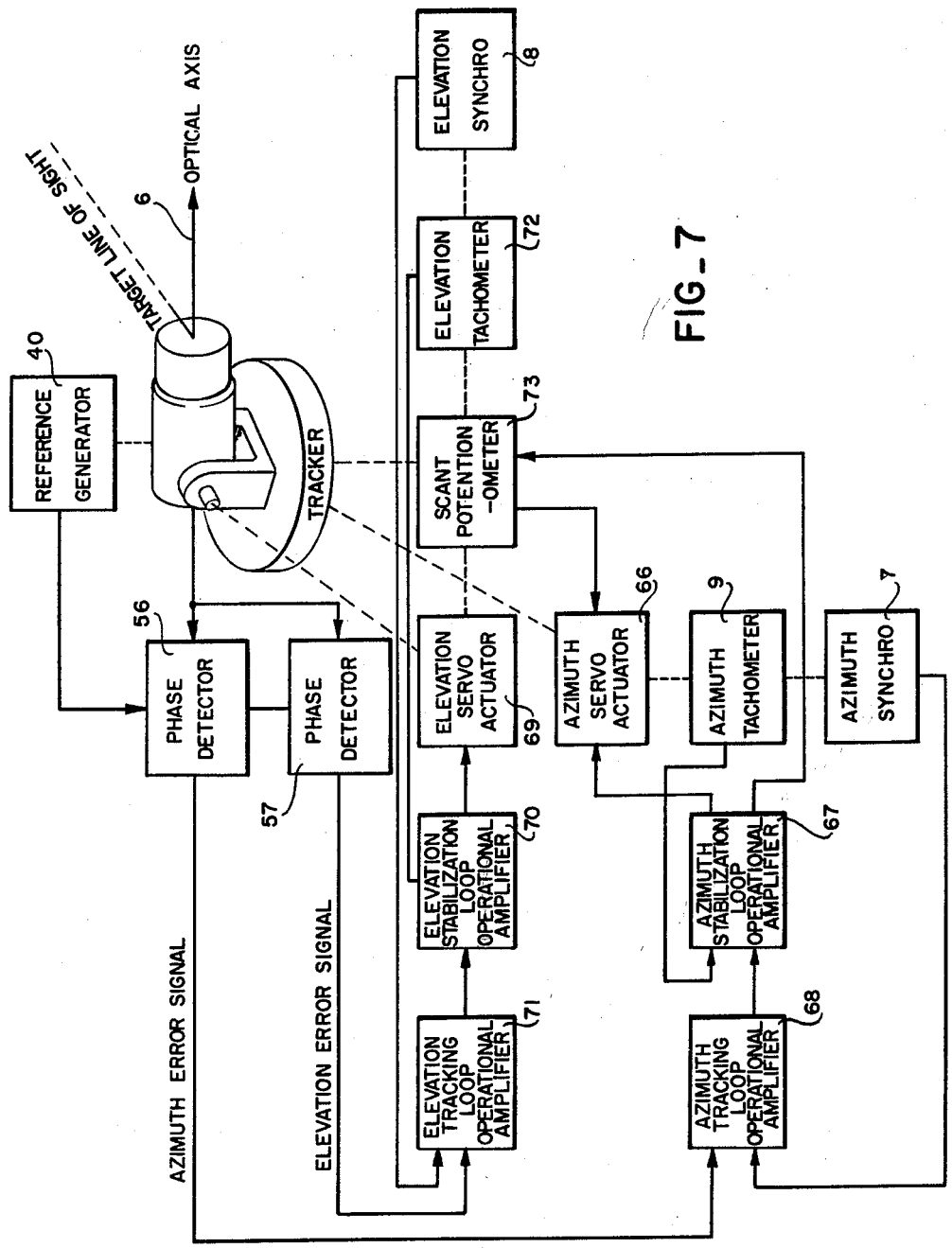

3,177,362
INFRARED TRACKER
Edgar W. Kutzscher and Dominic Amara, both of Sherman Oaks, Calif., assignors to Lockheed Aircraft Corporation, Burbank, Calif.
Filed Oct. 2, 1961, Ser. No. 142,114
8 Claims. (Cl. 250—83.3)

This invention relates to a tracking apparatus and more particularly to an improved infrared tracker capable of following the path through space of an infrared emissive target and continuously indicating the position of the target being tracked.

The infrared tracker described hereinafter is particularly suitable for use with an infrared search system as shown and described in co-pending application Serial No. 146,671 and/or an infrared spectrometer system as shown and described in co-pending application Serial No. 221,010, both of which are assigned to the same assignee as the assignee of the present invention.

The novel and improved tracker apparatus disclosed hereinafter is suitable for precisely tracking a wide variety of infrared emissive targets of military or scientific interest. Specifically, the invention is useful in connection with the tracking of rockets and high-speed jet aircraft. The apparatus employs a passive optical system responsive to infrared radiations and produces electrical error signals when the tracker aiming mechanism has not aimed the tracker directly at the target. These electrical signals can then be used to actuate a servo follow-up mechanism for aiming the tracker at the target and maintaining it on the target. The present invention contemplates novel and improved stabilization and servo systems which supply the motive power which keep the optical axes of the tracker aligned with the target. The preferred embodiment described herein is designed to follow targets emitting energy in the spectral region to which lead sulfide detectors are responsive and to have a sensitivity of approximately $2 \times 10^{-12}$ watts per square centimeter. The field of view of the preferred embodiment is 1 degree. The output of the tracker is in the form of D.-C. azimuth and elevation error signals which are proportional to the target angular errors.

The useful applications of a system of this nature are many, one of which being the control of an infrared spectrometer to maintain its line of sight on a moving target of interest, the specific uses forming the subject matter of co-pending applications.

It is, therefore, a principal object of the present apparatus to point the optical axis of a tracker accurately at an emissive target after acquisition has been accomplished; the initial target acquisition may be performed by an infrared search system of the type shown and described in co-pending application Serial No. 146,671 referred to hereinabove. When used with an infrared search system for initial target acquisition, the combined system will permit the detection of a target, and after a target is detected, it will be tracked automatically by the apparatus of the present invention while the search system continues to search for other targets.

It is another object of the present invention to provide novel and improved tracking apparatus for automatically following the trajectory or flight path of an infrared emissive target and continuously provide a precise indication of the instantaneous spatial position of said target.

Still another object of the invention is to provide novel and improved infrared tracking apparatus which will discriminate against spurious or background radiation while precisely following a distant target.

Yet another object of the invention is to provide a passive optical tracker capable of accurately following a high-speed target and producing electrical error signals suitable for controlling a servo follow-up system whenever the tracker aiming mechanism has not aimed the tracker directly at the target.

It is another object of the invention to provide an automatic means for tracking a moving infrared emissive target.

Still another object of the invention is to provide automatic tracking apparatus which will provide direct-current azimuth and elevation error signals which are proportional to target angular errors.

A general object of the invention is to provide a new and improved tracker which overcomes disadvantages of previous means and methods heretofore intended to accomplish generally similar purposes.

The above and further features, objects and advantages of the present invention will become more apparent in the following description of an exemplary embodiment thereof, taken in conjunction with the drawings, in which:

FIGURE 1 is a simplified schematic representation of a trunnion system for positioning the optical system of the tracker to the line of sight of a target being tracked.

FIGURE 2 is longitudinal section view of the optical system and scanning mechanism portion of the invention.

FIGURE 3 is a rear elevation view, partially in section, of the apparatus of FIGURE 2.

FIGURE 4 is a schematic representation of the tracker optical system.

FIGURE 5 is a simplified perspective view, partially broken away, illustrating the scanning mechanism employed in the tracker.

FIGURE 6 is a simplified block diagram of the electronic circuits employed in the tracker system.

FIGURE 7 is a block diagram of the tracker system of the invention.

Referring now to FIGURE 1, there is shown a simplified diagram of a trunnion system of the type which will permit the line of sight of the tracker optical system to be directed through 360° in azimuth and 90° in elevation. The tracker head containing the infrared responsive elements is carried within housing 1 which is rotatably mounted on trunnion 2 which permits it to swing through 90° of elevation. Trunnion 2 is in turn rotatably supported on base 4 which permits it to turn through 360° of azimuth. The motions of the trunnion system may be caused to generate error signals which may be used to position the tracker via a follow-up servomechanism or to slave other devices such as cameras, radiation measuring equipment, and radar antennas. The tracker head may be driven about the azimuth axis by servo motor 5 and may be driven through various elevation angles by servo motor 3. The instantaneous position of the tracker head is sensed by azimuth synchro transmitter 7 and elevation synchro transmitter 8, thus indicating the optical axis or line of sight 6. The slewing rate of the positioning system is measured by means of azimuth tachometer 9 and elevation tachometer 10 which are mechanically coupled to the drive system in any suitable and well-known manner.

In addition to the positioning system described above, the major components of the system include collecting optics, a scanner reticle and associated drives, a detector field lens assembly, and electronic processing circuits. The collecting optics consist of a modified Cassegrainian telescope system. Reflecting optics are preferred since they are compact, optically efficient, and can easily be made to produce a satisfactory image over the desired 1 degree field of view.

The optical system of the tracker is shown in FIGURES 2 and 4, and consists of an aspheric primary mirror 11 mounted within ring 12, which is carried inside cylindrical housing 13. The first surface of mirror 11 is aluminized and directs the incoming radiation onto spherical secondary mirror 14. The secondary mirror 14 is held by ring 15 which is threadedly attached to barrel shield 16. A Kovar spider assembly, comprising three vanes, two of which are shown at 17 and 18, and a tube 19, is used to support the secondary mirror 14. The end 20 of tube 19 is threaded and extends through a central aperture in primary mirror 11. Fastening ring 21 is threadedly attached to end 20 to secure the spider assembly.

Radiation from the aluminized first surface of the secondary mirror 14 is focussed onto the scanner-detector mechanism identified generally by reference numeral 22.

In order to detect a target against a sky background, a scanning mechanism is utilized which modulates the radiant energy from the target as it falls upon the radiant energy responsive device. The target signal thus generated can be compared to an internally generated reference signal in such a manner that the direction of deviation of the target from the line of sight can be ascertained. Thus, the scanning mechanism 22 can be considered as having a target detecting or sensing function as well as a phase discriminating function for determining the direction the target deviates from the projected line of sight.

A number of scanning mechanisms have been developed heretofore which are suitable for use in the present invention to provide the necessary output signal from a weak target in the presence of background interference. Although the tracker of the present invention is not dependent upon a particular scanner mechanism, in a preferred embodiment the energy collected by the optical system is modulated by a scanning system of the type shown and described in co-pending application, Serial No. 172,586 assigned to the same assignee as the present application. The preferred scanning system is of the rotating-nutating type which produces an FM signal from the infrared detector whenever the target is not at the center of the field of view. The advantages and theory of this type of scanner are described and shown in the above-mentioned co-pending application.

The modulated energy then falls on a field lens assembly and lead sulphide detector mounted in a Dewar cooling assembly which will be more fully described hereinafter. The scanning system and Dewar assembly are supported by baffle plate 23 mounted in housing 13, which is in turn carried by the trunnion system.

The novel rotating-nutating type scanner utilized in a preferred embodiment of the invention has the advantages of both of rotating and the nutating chopping systems employed heretofore.

In a rotating scanner, a circular reticle with alternating transparent and opaque areas (spokes) rotates in the field of view and modulates the energy in the scanned area. This scanning system gives all the tracking information necessary, is very simple to make, but has some disadvantages. The main disadvantage is that the target signal will nearly disappear when the target is on center so that tracking will not be very accurate. Another disadvantage is the fact that the spokes become wider with increasing radius, so that the effect of space filtering varies with radius.

A nutation scanner uses a reticle which is caused to move in a circular path without rotation, or conversely, the target image is caused to move in a circular path on a fixed reticle. If the radiation energy is received from a target which is in the center of the field of view, the target image describes a circle about the center of the reticle. This modulates the target radiation and a fixed frequency is obtained. If the target is off center, the image rotates eccentrically about the center of the reticle. This produces a frequency modulation of the signal which is a function the error angle (angular displacement off center).

Scanner detector 22 involves a scanning reticle which rotates as well as nutates. This scanning mechanism has the advantages of both the rotating and nutating chopper systems employed in prior devices, and minimizes their disadvantages. FIGURE 5 shows the mechanism of this system. Scanning reticle 25 is located with its center outside the field of view, but the reticle pattern covers the whole field of view, all of the time. The scanning reticle 25 rotates about its center and at the same time the center of the reticle rotates around the center of the field of view. This is accomplished by means of the following mechanism: drive motor 26 rotates cylindrical member 27 via the gear train comprising gears 28–30, the latter of which is directly attached to cylindrical member 27. Member 27 is rotatably supported by ball-bearings 31 and 32, the inner races of which are mounted on fixed tubular support 33. Support 33 is mounted on baffle plate 23. Annular gear ring 34 is formed directly on the exterior of tubular support 33. Pinion gear 35 is attached to shaft 36 which in turn is attached to collar 37 on reticle 25. Disc 38 is fixedly mounted on the forward end of member 27 and rotates therewith. Bushing 39 is carried in an aperture in disc 38.

As member 27 rotates, fixed gear ring 34 will impart a torque to pinion gear 35, which is journalled in disc 38. Thus, disc 38 and reticle 25 will both be caused to rotate in the same direction but at different speeds. As can be seen, this comprises a type of planetary drive. Disc 38 is provided with a portion of increased mass 38' for dynamic balance during rotation. Reference generator 40 is directly coupled to gear 29.

The detector assembly is located within tubular support 33 and behind field stop 42; this assembly will be described more fully hereinafter. Reticle 25 is provided with a plurality of curved spokes of equal width, one of which is indicated at 41. Being curved, the effect of space filtering will not vary over the field of view as would straight radial spokes. Experience has indicated that constant bar width reticles, such as shown in the preferred embodiment, gives the best performance; that is, with constant width bars, the field can be balanced and background discontinuities will seldom appear as targets. The size of these bars is necessarily related to the image and field size, and therefore the target, range, focal length and optical aberrations. The constant width spokes or bars, "spiralling" from the center of the disc are positioned in the focal plane of the optical system so that the field is completely on the reticle 25 while the center of the disc (collar 37) is outside the field. In a typical construction, the reticle bars are designed to have a width such that targets subtending less than 1 milliradian of arc are fully modulated and false targets, such as clouds, which are larger, are discriminated against. The bar size and field stop 42 are such that the signal from the uniform background is minimized. If it is known that only smaller angular targets are to be tracked, additional background discrimination can be employed. In a practical embodiment, the present invention may achieve an angular tracking error signal accuracy of better than 30 seconds of arc.

The actual detector or infrared radiation responsive element may be of any suitable and well-known construction and may be of the type disclosed in co-pending application Serial No. 172,587 assigned to the assignee of the present invention. Either a cooled or an uncooled lead sulfide detector 46 may be employed, as determined by the spectral range of interest.

If a cool target is to be tracked, and longer wavelength sensitivity is desired, the detector may be cooled by cryogenic means or other well-known means as will be obvious to those versed in the art. A coolable type of detector assembly is shown in FIGURES 4 and 5. The detector field lens assembly comprises first field lens element 43 and second field lens element 44. The lens assembly is integrated with a Dewar housing 45 which in turn is incorporated into the scanner-detector 22. This facilitates mounting of the field lens elements as well as making it possible to cool the radiation responsive detector by adding a simple liquid nitrogen cooling system.

In order to obtain sensitivity at still longer wavelengths, a lead selenide detector could be provided in the same size Dewar housing (45) and substituted for the lead sulfide cell 46, as will be obvious to those skilled in the art.

The radiation-responsive element 46 is deposited on lens 44 which may be fabricated from strontium titanate, and cooled to liquid nitrogen temperature. Leads 47 and 48 connect detector cell 46 to the related electronic equipment, as will be discussed more fully hereinafter. The first element 43 may be made of germanium and acts as the entrance window to the Dewar housing 45. Since germanium absorbs practically all the infrared radiation below 1.8 microns, lens 43 also acts as a filter, reducing the background radiation. Since system sensitivity and noise are adversely affected by large detector cell size, the focal length and field of view are chosen to minimize the required detector size. Also a small field of view is effective in reducing background noise. In a preferred construction, the dimensions of the field lens assembly is selected to concentrate the energy onto a 1 x 1 millimeter detector cell. Field lenses 43 and 44 comprise a doublet and may be provided with an anti-reflection coating on the germanium front element 43. This type of system provides a maximum amount of optical gain.

A block diagram of the electronic circuits necessary to process the FM signal from the infrared detector is shown in FIGURE 6. As stated previously, the scanning mechanism produces a frequency modulated signal if the target image is not at the center of the field of view.

That is, when the target line of sight and the optical axis differ reticle 25 interrupts the target radiation with a varying frequency. The signal from the detector 46 behind this reticle is frequency modulated about a center frequency equal to the chopping frequency of rotation. When this FM signal is demodulated, it yields an A.C. error signal whose phase and amplitude locate the target with respect to a coordinate system on the field at the focal plane. If the target is in the center, it is cyclically interrupted or chopped at a constant frequency. The phase of the frequency modulation (in the case that the target is not centered) gives the direction of the target with regard to a reference. The modulation amplitude of the frequency modulated signals gives the angular distance of the target from the center of the field of view (error signal). The modulation amplitude is proportional to the error angle over the whole field of view. The signal from the detector cell 46 is transmitted via leads 47 and 48 to a preamplifier 49 which is a low-noise impedance matching device. In addition to providing an impedance match, preamplifier 49 contains an automatic gain control and a band-pass filter. The output of the filter has a 400 cycle band width and has approximately the same amplitude for any target range. The signal from the filter is fed into a pulse-forming circuit 50 which converts the positive-going zero crossings into pulses capable of triggering a monostable multivibrator.

In a typical construction, the FM signal may have a center frequency of 3106 cycles per second and a maximum deviation of + or −200 cycles per second at a modulation rate equal to the nutation rate, which may be, for example, 10 cycles per second. The deviation about the center frequency is proportional to the target's angular distance off boresight, while the phase of the detected FM signal gives the angular coordinates of the target image in the field of the tracker.

The method of removing the output signal (error information) from the carrier depends on how the information is coded onto the carrier. A number of straightforward methods have been developed heretofore which are suitable for this application; certain ones of these have been used previously with radar. The outputs of these circuits comprise D.C. error signals which indicate the target position, with respect to the optical axis. With reference to FIGURE 6, FM discriminator 51 obtains an amplitude-modulated signal from modulated FM carrier. The output from discriminator 51 is supplied to amplifier 53 via low-pass filter 52. The amplified output is supplied, simultaneously, to a pair of phase detectors 56 and 57 via isolation amplifiers 54 and 55. Each phase detector is supplied with a reference frequency input from reference generator 40, via square wave generators 58 and 59. By using two phase detectors (56, 57) azimuth and elevation error signals are obtained. Generator 40 is mechanically driven in synchronism with the scanning reticle. The output from phase detector 56 comprises the azimuth error signal and the output from phase detector 57 comprises the elevation error signal. These signals are amplified and filtered via amplifiers 60–61 and 62–63, respectively.

Referring again to FIGURE 1, synchro transmitters 7 and 8 are geared to the shafts through which the trunnion system azimuth and elevation are controlled. In the acquisition mode, these synchros supply reference signals by which any difference in the angular position of the trunnion system and the optical axis of the acquisition device is measured. Error voltages supplied from the synchro transmitters 7 and 8, are used to drive servo motors on the appropriate axes of the trunnion system, in the proper phase to minimize this difference. The error signals from the tracker, appearing on lines 74 and 75, may be used for various purposes such as directly recording the target's angular coordinates, in any of various recording media, for position or control of a second device such as a radar antenna, or to present target position data on an oscilloscope or other indicator for use by an operator.

When a target appears in the field of view of the tracker, signals for centering the target in the field, and therefore the field of view of related apparatus, are supplied to the servo motors by the tracker electronic system.

There is shown in FIGURE 7 a simplified block diagram of the tracking system which is responsive to the error signals obtained from the above-discussed circuits. The servo system supplies the motive power which keeps the optical axes of the tracker optical system aligned with the target line of sight. This system is so designed that tracking errors due to target angular position velocity, and acceleration are minimized. Inasmuch as each of the functional units represented by a block in FIGURE 7 may be any one of the numerous devices for each respective function, well-known in the art, it is deemed unnecessary to show circuit details. The description of this portion of the invention is considered sufficient to enable those skilled in the art to practice it.

For purposes of clarity the azimuth servo system will be described in detail first, it being understood that the elevation servo system is essentially identical.

Two identical servo systems are provided; one operating the elevation axis and the other operating the azimuth axis. Each servo system consists of an inner loop and an outer closed loop. The inner loop provides stabilization and position memory to the system, while the outer loop provides the position error nulling function.

Referring now to FIGURE 7, the inner loop consists of servo actuator 66, azimuth stabilization loop operational amplifier 67, together with the dynamics of the load. The feedback portion includes a velocity measurement obtained from azimuth tachometer 9.

In a typical construction, the servo actuator 66 may comprise a three phase 400 c.p.s. A.C. motor, a pair of magnetic particle clutches and appropriate gear trains to permit the load to be driven in either direction. In this unit, the motor continuously rotates the two clutch cases in opposite directions at an angular velocity of about ⅟₇ that of the motor rotor. Torque to the clutch motors is controlled by means of a current in a solenoid carried in the clutch case. The magnetic circuit of the solenoid is completed by a magnetic powder in a cylindrical gap which contains the rims of the cup-shaped rotor. Such a unit is capable of applying very large torque to the low inertia rotor, thus making possible extremely rapid changes of direction of the output shaft which is driven in opposite directions by the two motors. Because of the relatively low speed and inertia of the clutch rotors, the system inertia is determined primarily by the mechanical load. This permits the design of a very high performance servo with a relatively small motor. An additional advantage of this actuator over the typical two-phase servo motor is that the controlling power to the clutch coils is very small making unnecessary the use of very large power amplifiers.

Tachometer 9 may be of the D.C. type, geared to give reasonably good linearity. The outer loop consists of a tracking operational amplifier 68 in the forward portion and the position error sensing devices in the feedback portion. This operational amplifier (68) also provides both integral and proportional outputs which supply the command signal to the inner loop. The integral signal provides velocity memory to minimize the effects of tracker signal noise and interruptions.

During automatic tracking, D.-C. error signals proportional to the position errors in the appropriate axes are provided by the tracker electronic system. During target acquisition, the synchro transmitters 7 and 8 provide the error signals to the servo system. Whatever acquisition device is used must be provided with similar synchros geared in the same ratios as synchros 7 and 8 to provide acquisition error signals.

The elevation servo system is generally similar to the azimuth system and comprises elevation servo actuator 69, stabilization loop operational amplifier 70, and tracking loop operational amplifier 71. Elevation tachometer 72 is in the feedback portion of this system.

To maintain relatively constant gain in the azimuth servo loop as elevation varies, the elevation axis drives a potentiometer 73 which provides an output approximately proportional to the scant of the elevation angle. This compensates for the fact that the tracker actually measures error in the plane perpendicular to the line of sight, and hence, the output of the azimuth error channel is actually proportional to the azimuth error multiplied by the cosine of the elevation angle.

The invention resides partly in the physical and electrical structure and inter-relationships embodied in the optical system, the scanner-detector, and the electronic circuit of the system as hereinabove specifically illustrated, but also embraces the concept of the system itself, considered as an integrated whole, and independently of the structural details of its several parts.

In summary, there has been described in this specification, and illustrated in the accompanying drawings, an infrared tracker which will follow infrared emissive targets and provide D. C. azimuth and elevation error signals which are proportional to angular errors between target line of sight and the tracker's optical axis. Obviously, many modifications and variations of the present invention are possible in the light of the above teachings. It is, therefore, to be understood that within the scope of the appended claims the invention may be practiced otherwise than as specifically described.

We claim:

1. Tracker apparatus responsive to an infrared emissive target comprising, optical means for collecting and focusing energy from said target onto an image plane, an infrared responsive detector cell located adjacent said image plane in coaxial alignment with the optical axis of said optical means, scanning means located at said image plane for modulating the energy falling upon said cell to provide a frequency modulated signal whenever the image of said target is displaced from said optical axis, the phase of said frequency modulated signal corresponding to the direction of displacement between said target's line of sight and said optical axis, the amplitude of said frequency modulated signal corresponding to the magnitude of the angular displacement between said target line of sight and said optical axis, and electronic circuit means for converting said frequency modulated signal to azimuth and elevation direct-current error signals, the polarity and magnitude of said error signals corresponding to the direction and magnitude, respectively, of the displacement between said target's line of sight and said optical axis.

2. Tracker apparatus as defined in claim 1, having azimuth and elevation servo means responsive to said direct-current error signals for directing said optical means to maintain substantially continuous coincidence between said target's line of sight and said optical axis.

3. Tracking apparatus for automatically following the path of an infrared emissive target comprising, a trunnion system having two degrees of freedom about an azimuth axis and an elevation axis, an optical system comprising a primary Cassegrainian mirror for receiving and focusing energy from said target, a secondary spherical mirror for directing the focused energy from said primary mirror onto an image plane, a scanning reticle located at said image plane, drive means coupled to said scanning reticle for cyclically interrupting said focused energy, detector cell means responsive to infrared energy, field lens means for focusing said cyclically interrupted energy onto said detector cell means to provide a pulse train signal from said cell means, electronic means responsive to frequency deviations of said pulse train signal for generating a D.C. error signal whose sign corresponds to the direction of displacement between the optical axis of said optical system and the target line of sight, said electronic means also being responsive to the amplitude of said pulse train signal to control the amplitude of said D.C. error signal to be directly proportional to the magnitude of displacement between said optical axis and said target line of sight, and azimuth and elevation servo means connected to said trunnion system, said servo means being responsive to said D.C. error signal for maintaining said optical axis in coincidence with said target line of sight.

4. Tracker apparatus responsive to an infrared emissive target comprising, optical means for collecting and focusing energy from said target onto an image plane, an infrared responsive detector cell located adjacent said image plane in coaxial alignment with the optical axis of said optical means, means operative upon said energy prior to impinging on said cell to produce a cell output which is frequency modulated in accordance with the azimuth of the target's position and amplitude modulated in accordance with the elevation of the target's position, means for converting said modulated signal to azimuth and elevation error signals, and means responsive to said signals for positioning the optical axis of said optical means to correspond with the line sight of said target.

5. Tracker apparatus as defined in claim 4 wherein said positioning means comprises, a trunnion system having two degrees of freedom, and servo means responsive to said signals for moving said trunnion system in azimuth and elevation.

6. Tracker apparatus responsive to an infrared emissive target comprising, optical reflecting means for collecting and focusing energy from said target onto an image plane, an infrared responsive detector cell located adjacent said image plane in coaxial alignment with the optical axis of said reflecting means, scanning means located at said image plane for modulating the energy impinging on said cell to provide a frequency modulated signal whenever the target image is displaced from the optical axis, said scanning means comprising means for providing a phase for said frequency modulated signal corresponding to the direction of displacement between said target's line of sight and said optical axis, means for controlling the amplitude of said frequency modulated signal in accordance with the magnitude of angular displacement between said target's line of sight and said optical axis, demodulator means for demodulating said frequency modulated signal to give an azimuth error signal and demodulating said amplitude modulated signal to give an elevation-error signal, and servo means responsive to said error signals for positioning the optical axis of said reflecting means to correspond with said line of sight of said target.

7. Tracker apparatus as defined in claim 6, wherein said servo means comprises, azimuth and elevation servomotor means coupled to said reflecting means, azimuth and elevation loop amplifiers responsive to said azimuth and elevation error signals, respectively, for driving said servomotor means, and azimuth and elevation tachometer means mechanically coupled to said reflecting means and electrically coupled to said azimuth and elevation loop amplifiers, respectively, to provide velocity control of said servo means.

8. Tracker apparatus as defined in claim 7, having potentiometer means mechanically coupled to said elevation servomotor means and electrically coupled to said azimuth loop amplifier for providing a compensating signal to said azimuth loop amplifier which is substantially proportional to the secant of the elevation angle of said reflecting means and thereby maintain substantially constant gain through said azimuth loop amplifier as the elevation angle of said reflecting means varies.

References Cited by the Examiner
UNITED STATES PATENTS

| 2,930,894 | 3/60 | Bozeman | 250—203 |
| 2,961,545 | 11/60 | Astheimer et al. | 250—83.3 X |
| 3,007,053 | 10/61 | Merlen | 250—203 |
| 3,012,148 | 12/61 | Snyder et al. | 250—83.3 X |
| 3,076,095 | 1/63 | Becklund et al. | 250—83.3 X |
| 3,106,642 | 10/63 | Shapiro | 250—83.3 |

RALPH G. NILSON, *Primary Examiner.*
ARCHIE R. BORCHELT, *Examiner.*